United States Patent
Hyde et al.

(10) Patent No.: US 10,249,921 B2
(45) Date of Patent: Apr. 2, 2019

(54) FAST THERMAL DUMPING FOR BATTERIES

(71) Applicant: Elwha LLC, Bellevue, WA (US)

(72) Inventors: Roderick A. Hyde, Redmond, WA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 1145 days.

(21) Appl. No.: 13/901,251

(22) Filed: May 23, 2013

(65) Prior Publication Data

US 2014/0349145 A1 Nov. 27, 2014

(51) Int. Cl.
| | | |
|---|---|---|
| *H01M 10/6568* | (2014.01) | |
| *H01M 10/6569* | (2014.01) | |
| *H01M 10/63* | (2014.01) | |
| *H01M 10/6557* | (2014.01) | |

(52) U.S. Cl.
CPC ....... *H01M 10/6569* (2015.04); *H01M 10/63* (2015.04); *H01M 10/6557* (2015.04)

(58) Field of Classification Search
CPC ................................................ H01M 10/6569
See application file for complete search history.

(56) References Cited

U.S. PATENT DOCUMENTS

| | | | |
|---|---|---|---|
| 6,891,353 B2 | 5/2005 | Tsukamoto et al. | |
| 7,592,776 B2 | 9/2009 | Tsukamoto et al. | |
| 2004/0004464 A1 | 1/2004 | Tsukamoto et al. | |
| 2004/0163398 A1 | 8/2004 | Morishita et al. | |
| 2005/0029990 A1 | 2/2005 | Tsukamoto et al. | |
| 2006/0037793 A1* | 2/2006 | Horii ........................ | B62M 7/02 180/89.2 |
| 2009/0139781 A1 | 6/2009 | Straubel | |
| 2009/0246606 A1* | 10/2009 | Shimizu .............. | H01M 10/625 429/62 |
| 2011/0262784 A1* | 10/2011 | Suga .................... | H01M 10/486 429/62 |
| 2012/0231306 A1* | 9/2012 | Herron .................. | B60L 3/0046 429/53 |
| 2013/0074525 A1 | 3/2013 | Johnston et al. | |

FOREIGN PATENT DOCUMENTS

| | | |
|---|---|---|
| JP | 2010-277767 A | 9/2010 |
| JP | 2013-062207 A | 4/2013 |
| KR | 10-2010-0041727 A | 4/2010 |

OTHER PUBLICATIONS

PCT International Search Report; International App. No. PCT/US2014/039008; dated Sep. 12, 2014; pp. 1-3.

* cited by examiner

*Primary Examiner* — Ladan Mohaddes

(57) ABSTRACT

A cooling system includes a fluid delivery system configured to bring a working liquid (such as water) into thermal contact with a battery where it vaporizes into an exhaust gas, and an exhaust system configured to vent the exhaust gas.

45 Claims, 4 Drawing Sheets

FAST THERMAL DUMPING FOR BATTERIES

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

SUMMARY

In one aspect, a system for cooling thermal runaway in a batter includes a fluid delivery system configured to transport a working liquid (e.g., water, a CFC, an HFC, an HCFC, a BCFC, or a mixture thereof) into thermal contact with the battery and further configured to permit the working liquid to vaporize to form an exhaust gas, and an exhaust system configured to vent the exhaust gas. The system may include a storage tank for the working liquid, and may be configured to work without a connection to an external source of working liquid. The system may include a structure configured to route the working liquid through the battery interior, for example multiple channels that bring working liquid through a plurality of locations within the battery. These may be configured to cool the battery at different cooling rates in different locations, for example separately controlling the cooling rate of each cell of a multi-cell battery. The fluid delivery system may include a pump, a valve, or a pressurization source (e.g., a source pressurized by a portion of the exhaust gas). The system may further include triggering circuitry configured to activate the cooling system in response to a battery condition (e.g., temperature, current, rate of change of temperature, acceleration, acceleration history, speed, speed history, internal pressure of the battery, or structural integrity of the battery), and optionally a memory configured to store a record of the battery condition or a record of the cooling system activation. The system may include a heat transfer structure (e.g., including a heat pipe, a coolant flow conduit, or a thermal conductor) configured to transport heat from the interior of the battery to an external heat exchanger, where the fluid delivery system is configured to route the working liquid into thermal contact with the external heat exchanger. The system may include triggering circuitry configured to activate the cooling system in response to an external command, or flow rate circuitry configured to control a flow rate of the working liquid within the fluid delivery system in response to a battery condition (e.g., battery temperature profile). The system may be configured to deliver working liquid to different cells of the battery at different rates.

In another aspect, a method of cooling a battery includes bringing a working liquid (e.g., water, a CFC, an HFC, an HCFC, a BCFC, or a mixture thereof) into thermal contact with the battery, allowing the working liquid to vaporize to form an exhaust gas, and venting the exhaust gas. The method may include storing the working liquid the working liquid in a storage tank, and bringing it from the tank without an existing connection to an external liquid supply. The method may include routing the working liquid through the battery interior, for example via multiple channels that bring working liquid to a plurality of locations within the battery. These may be configured to cool the battery at different cooling rates in different locations, for example separately controlling the cooling rate of each cell of a multi-cell battery. The method may include pumping the working liquid. The method may further include activating the cooling system in response to a battery condition (e.g., temperature, current, rate of change of temperature, acceleration, acceleration history, speed, speed history, internal pressure of the battery, or structural integrity of the battery), and optionally storing a record of the battery condition or a record of the cooling system activation in a memory. The method may include transporting heat via a heat transfer structure (e.g., a heat pipe, a coolant flow conduit, or a thermal conductor) from the interior of the battery to an external heat exchanger, and placing the working liquid into thermal contact with the external heat exchanger. The method may include activating the cooling system in response to an external command, or adjusting a flow rate of the working liquid within the fluid delivery system in response to a battery condition (e.g., battery temperature profile). The method may include delivering working liquid to different cells of the battery at different rates.

In still another aspect, a system for cooling a battery includes means for bringing a working liquid (e.g., water, a CFC, an HFC, an HCFC, a BCFC, or a mixture thereof) into thermal contact with the battery, means for allowing the working liquid to vaporize to form an exhaust gas, and means for venting the exhaust gas. The system may include a storage tank that stores the working liquid, and means for bringing it from the tank without an existing connection to an external liquid supply. The system may include means for routing the working liquid through the battery interior, for example via multiple channels that bring working liquid to a plurality of locations within the battery. These may be configured to cool the battery at different cooling rates in different locations, for example separately controlling the cooling rate of each cell of a multi-cell battery. The means for bringing the working liquid into thermal contact with at least a portion of the battery may include a pump, a valve, or a pressurization source. The system may further include means for activating the cooling system in response to a battery condition (e.g., temperature, current, rate of change of temperature, acceleration, acceleration history, speed, speed history, internal pressure of the battery, or structural integrity of the battery), and optionally means for storing a record of the battery condition or a record of the cooling system activation in a memory. The system may include means for transporting heat via a heat transfer structure (e.g., a heat pipe, a coolant flow conduit, or a thermal conductor) from the interior of the battery to an external heat exchanger, and means for placing the working liquid into thermal contact with the external heat exchanger. The system may include means for activating the cooling system in response to an external command, or means for adjusting a flow rate of the working liquid within the fluid delivery system in response to a battery condition (e.g., battery temperature profile). The system may include means for delivering working liquid to different cells of the battery at different rates.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
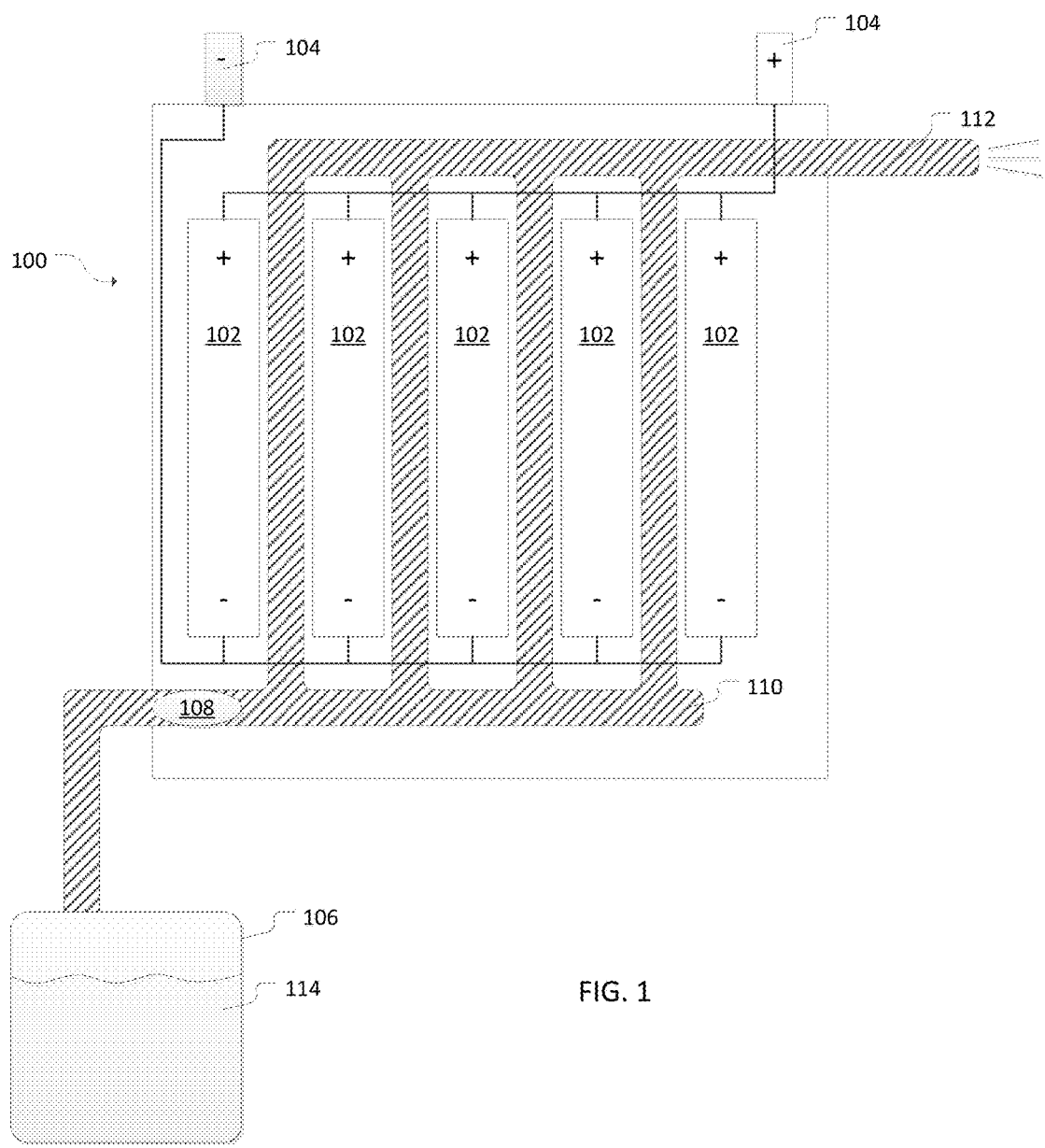
FIG. 1 is a battery cooling system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The term "circulated," as it is used herein, includes flowing a fluid through a pipe, channel, or conduit, or through an indeterminate path such as through an open-cell foam, either once or multiple times. The term "recirculated," as it is used herein, includes circulating a fluid in a configuration in which it passes through the same portion of an apparatus more than once.

FIG. 1 is a schematic drawing illustrating a cooling system for a battery 100, such as an auto battery. Battery 100 includes multiple cells 102, each with a positive and negative terminal as shown. Cells 102 are wired in parallel and connected to positive and negative battery terminals 104 in a conventional manner. A fluid delivery system includes reservoir 106, pump 108, heat exchanger pipes 110, and exhaust 112. Reservoir 106 holds a working liquid 114. Any convenient working liquid that may be circulated through the battery at its working temperature and that may be vaporized as described below may be used. It is expected that water will represent a good working liquid in many embodiments, since it has a relatively high heat of vaporization and is innocuous when vented to the atmosphere, but in some embodiments, more exotic working liquids may be appropriate, such as chlorofluorocarbons (CFCs, e.g., FREON™), hydrofluorocarbons (HFCs), hydrofluorochlorocarbons (HCFCs), bromochlorofluorocarbons (BCFCs), or mixtures of any of the preceding compounds, which may, for example, be azeotropic mixtures.

Heat exchanger pipes 110 are provided that allow working liquid 114 from reservoir 106 to be circulated through the battery, either by free convection or assisted by one or more pumps 108. (One pump is illustrated in FIG. 1, but in other embodiments, pumps 108 may be provided throughout the system, which may be jointly or separately controlled, as further discussed below in connection with FIG. 3. Alternatively, instead of a pump, the system may harness pressure generated by vaporization of working fluid 114 or the energy of a catastrophic event precipitating rapid cooling, as further discussed below.) In the embodiment shown in FIG. 1, the system includes defined pipes in thermal communication with the battery cells 102, but in other embodiments, fluid may be circulated around or even through the cells in any convenient configuration. For example, cells 102 may be embedded in an open-cell foam through which the working liquid 114 circulates, or there may be perforations in cells 102 that are designed to permit working fluid 114 to exchange heat with cells 102 without unacceptably degrading the electrical performance of the cells. In some embodiments, solid heat pipes or similar structures (not shown) conduct heat out of the cells to the heat exchanger pipes 110. The illustrated heat exchanger pipes 110 are connected to exhaust 112 that allows vaporized working liquid to be vented, for example to the atmosphere or to a sealed balloon or the like (not shown) where it can be subsequently harvested for reuse.

Figure 2:
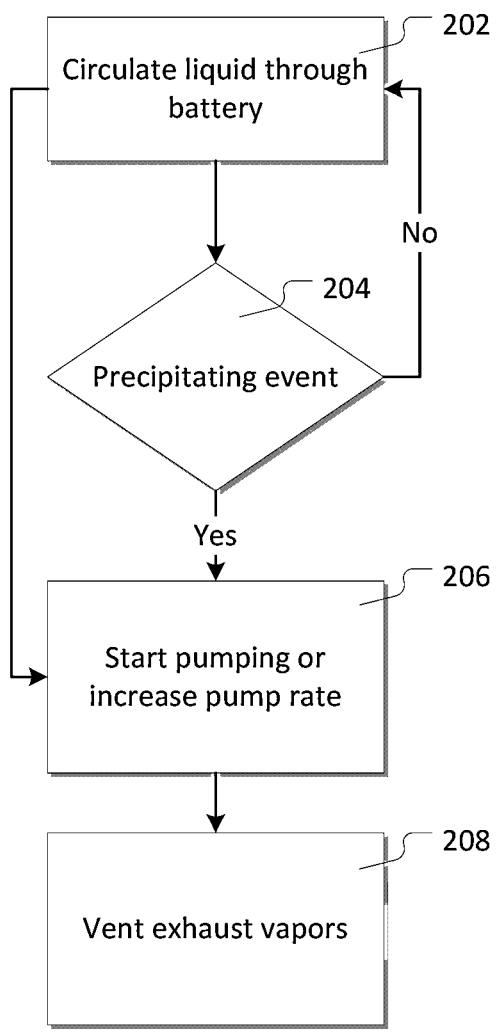
FIG. 2 is a flow chart of a method of operating the battery cooling system of FIG. 1.

FIG. 2 is a flow chart illustrating steps of one method of using the cooling system illustrated in FIG. 1. In normal operation, working liquid 114 circulates 202 through battery 100 to cool it, either through free convection or assisted by pump 108. However, upon experiencing a precipitating event 204, system 100 shifts to an irreversible cooling mode designed to cool the battery as fast as possible, before thermal runaway can occur. In some embodiments, precipitating events may include temperature exceeding a threshold, rate of temperature change exceeding a threshold, rapid acceleration of the system (e.g., an impact), internal pressure of the battery, compromise of the integrity of one or more cells 102, or a received command such as a wireless command. In the embodiment shown in FIG. 1, working liquid 114 is pumped through the system by pump(s) 108 to cool the battery 206, and is allowed to vaporize 208 to absorb as much heat as possible via evaporative cooling, and is vented to the atmosphere through exhaust 112.

Figure 3:
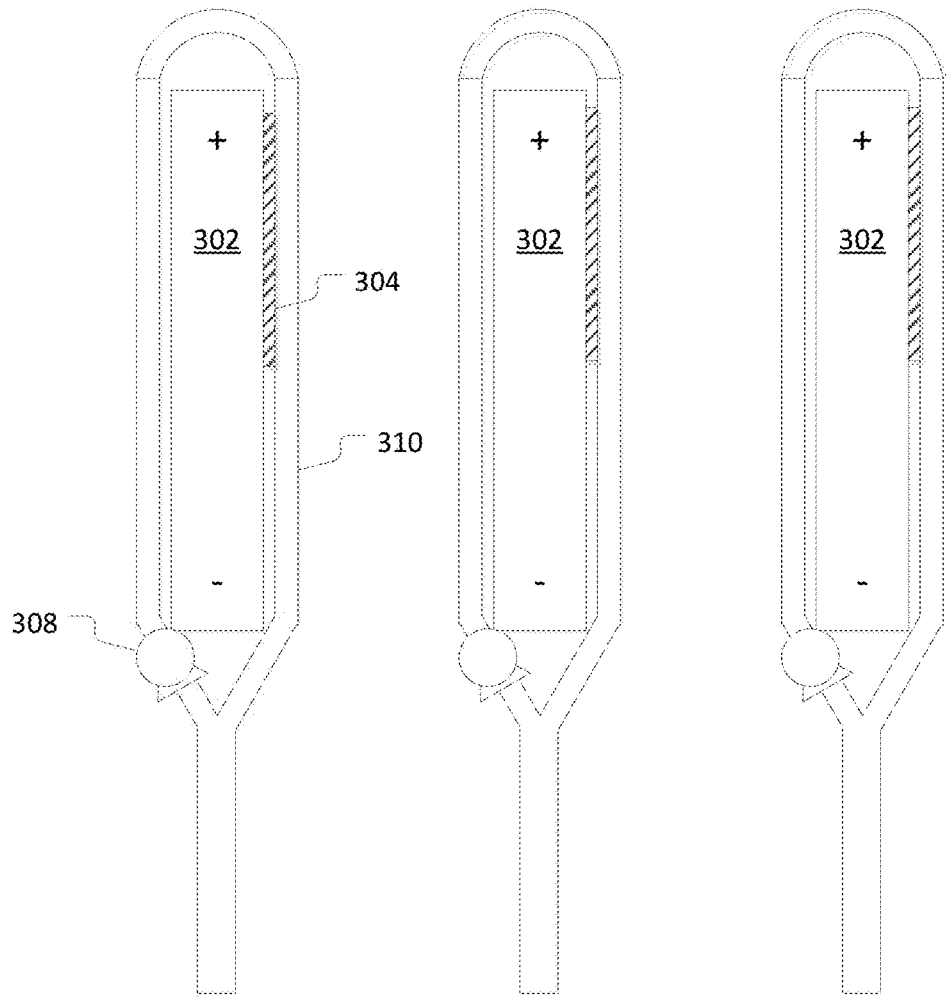
FIG. 3 is a detail of a battery having separate flow control in different cells.

FIG. 3 is a schematic showing the interior of a battery equipped to individually control the cooling rate for each cell. Each cell 302 has an associated heat exchanger pipe 310, each with its own pump 308. The schematic illustration shows each heat exchanger pipe 310 as a loop around cell 302, but it will be understood that the path of each pipe 310 may vary from this configuration, and should be designed to efficiently remove heat from cell 302. Thermocouple 304 is positioned to measure the temperature of cell 302, and to provide a feedback signal to pump 308. The speed of pump 308 is controlled relative to the temperature measured by thermocouple 304 so that cell 302 is cooled at a controlled rate, which can be independently controlled for each cell 302. For example, more cooling may be needed for cells in the center of the battery than for cells at the periphery.

Thermocouple 304 and pump 308 may also be connected to circuitry for measuring and recording the temperature and cooling rate of the battery. In some embodiments, such a record may include time-stamping or place-stamping (e.g., via GPS), so that the performance of the battery can be reconstructed, for example for forensic purposes after an accident.

In other embodiments, rather than directly routing the working liquid through the battery, the battery may include thermal conductors (heat pipes) configured to transport heat to a heat exchanger. In some embodiments, a single or a few heat pipes may serve the whole battery, which is others, individual heat pipes may be provided for each cell or other region of the battery interior. In embodiments in which heat pipes are provided to transport heat to a heat exchanger, the working liquid is brought into thermal contact with the heat pipes, which in some embodiments may be outside of the main battery compartment. Those of skill in the art will recognize that this design may facilitate the construction of batteries that need not be able to tolerate working liquid in the battery interior, but that this advantage must be balanced against possible inefficiencies in transporting heat to the working liquid (instead of transporting the working liquid to the heat source).

Pressures generated by vaporization of a working liquid in a battery can be quite high if the fluid is not adequately vented. Plumbing in the battery should generally be designed with an eye to managing pressures to avoid rupturing a heat exchanger pipe within the battery, although in some embodiments, planned rupture may be used to improve heat transfer within the battery. However, such pressures can also be leveraged to increase fluid flow, in some embodiments even to the point where pump 108 can be omitted from the system. In some embodiments, liquid recirculates around the battery (with or without a pump), until the cooling system is activated (for example, by a substantial temperature excursion within the battery, or by a detected rapid deceleration indicative of an impact).

Figure 4:
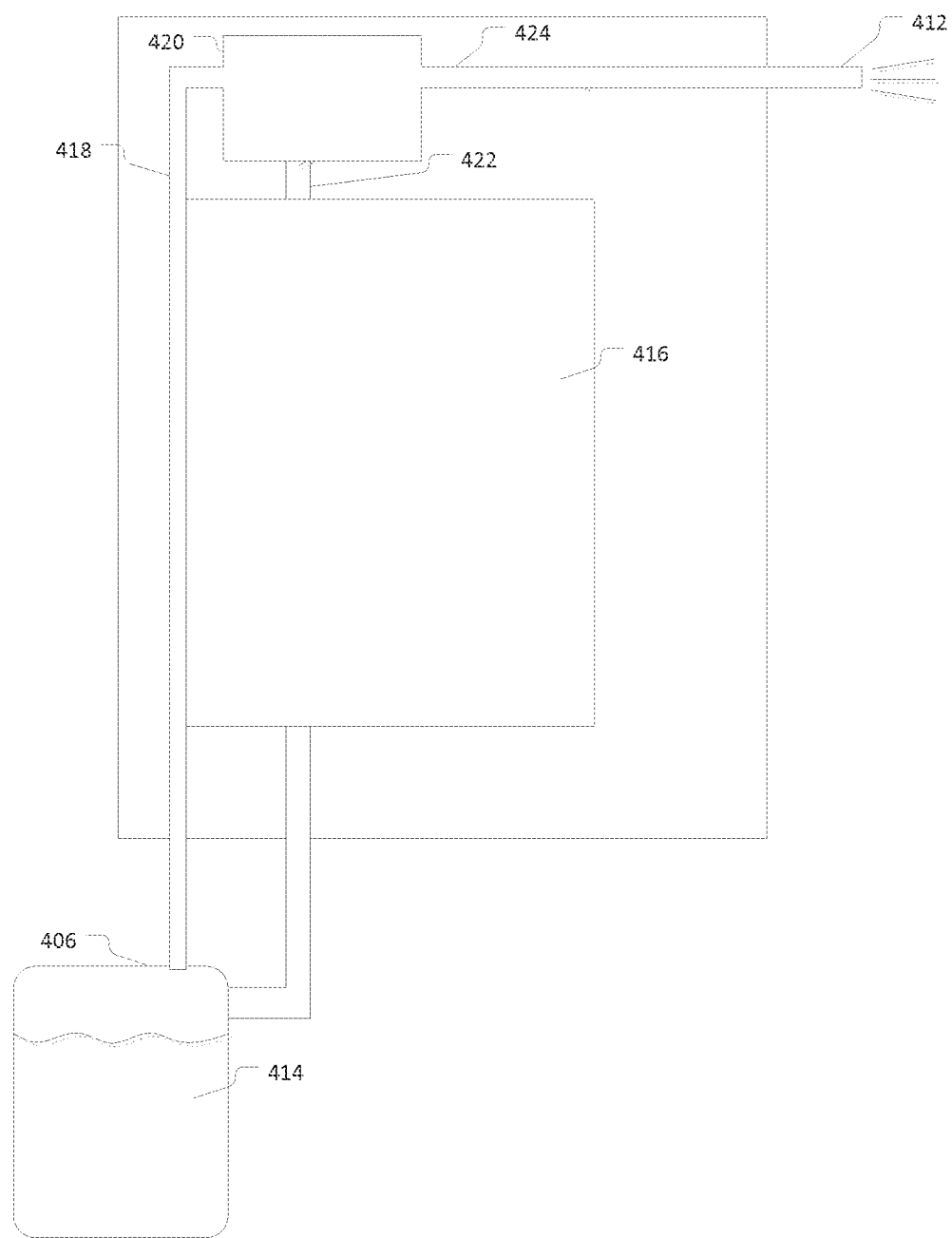
FIG. 4 is a detail of a battery having valves to control routing of exhaust gas.

FIG. 4 shows an exhaust system that uses internal pressure to reroute the path of the exhaust gas. Working liquid 414 is stored in reservoir 406 and circulated through battery 416, absorbing heat from the battery and vaporizing to form exhaust gas. Exhaust port 418 for the vaporized exhaust gas leads to a chamber 420 having two one-way, pressure activated, valves. Recirculation valve 422 opens at a first pressure $P_1$, thereby allowing pressurization of the reservoir 406. If the pressure reaches a greater pressure $P_2$, exhaust valve 424 opens, allowing excess exhaust gas to be vented through exhaust pipe 412.

While the novel batteries presented herein may be used in stationary applications, they are particularly well-suited for use in vehicles or other devices that move independently (e.g., robots or autonomous vehicles). In such embodiments, the vehicle or other device typically carries a tank of working liquid that may be vented in the case of a battery failure. For example, currently used electric vehicle batteries usually store about 15-60 kW-h of electrochemical energy. Water absorbs about 2.3 kJ/g when vaporized, so it would require about 22-87 kg of water to be vaporized to dissipate all of the electrochemical energy in the battery (neglecting energy used to heat the water to the boiling point and any possible parasitic losses), a reasonable amount to carry with the battery in a dedicated storage tank or the like (22 kg of water occupies less than a cubic foot of space). (Dichlorodifluoromethane (FREON-12) is much less efficient with a latent heat of vaporization of 0.17 kJ/g, but may nevertheless be preferable in some embodiments.) Those of skill in the art will understand that these numbers are estimates used to demonstrate feasibility of the concept and are not intended to be limiting. In some embodiments, slower cooling or incomplete cooling may be tolerable, in which case less working liquid may be carried. In other embodiments, speed of cooling may be paramount, in which case pumping must be faster and thermal transfer to the working liquid made as efficient as possible to optimize performance.

Various embodiments of electrochemical devices and methods have been described herein. In general, features that have been described in connection with one particular embodiment may be used in other embodiments, unless context dictates otherwise. For example, the individual cell cooling described in connection with FIG. 3 may be employed in the devices described in connection with FIG. 4, or with any of the embodiments described herein. For the sake of brevity, descriptions of such features have not been repeated, but will be understood to be included in the different aspects and embodiments described herein.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a cell" should typically be interpreted to mean "at least one cell"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two heat pipes," or "a plurality of heat pipes," without other modifiers, typically means at least two heat pipes). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A cooling system for cooling thermal runaway in a battery, the system comprising:
   a fluid delivery system configured to transport a working liquid into thermal contact with the battery and further configured to permit the working liquid to vaporize upon said thermal contact to form an exhaust gas; and
   an exhaust system configured to vent the exhaust gas from the fluid delivery system to the environment.

2. The system of claim 1, wherein the working liquid includes water.

3. The system of claim 1, wherein the working liquid includes a chlorofluorocarbon, hydrofluorocarbon, hydrofluorochlorocarbon, bromochlorofluorocarbon, or a mixture of any of the preceding compositions.

4. The system of claim 1, further comprising a storage tank for the working liquid, wherein the system is configured to cool thermal runaway without a present connection to an external source of working liquid.

5. The system of claim 1, wherein the fluid delivery system includes a structure configured to route the working liquid through the battery interior.

6. The system of claim 5, wherein the fluid delivery system includes a plurality of channels configured to route the working liquid through a plurality of locations within the battery.

7. The system of claim 6, wherein the fluid delivery system includes a structure configured to separately control a flow rate through the plurality of channels, wherein the fluid delivery system is configured to cool different portions of the battery at different cooling rates.

8. The system of claim 7, wherein the battery includes a plurality of cells, and further comprising a control system configured to direct the fluid delivery system to cool each cell separately.

9. The system of claim 1, wherein the fluid delivery system includes a pump.

10. The system of claim 1, wherein the fluid delivery system includes a valve.

11. The system of claim 1, wherein the fluid delivery system includes a pressurization source.

12. The system of claim 11, wherein the pressurization source includes at least a portion of the exhaust gas.

13. The system of claim 1, further comprising triggering circuitry configured to activate the cooling system in response to a battery condition.

14. The system of claim 13, wherein the battery condition is temperature.

15. The system of claim 13, wherein the battery condition is current.

16. The system of claim 13, wherein the battery condition is rate of change of temperature.

17. The system of claim 13, wherein the battery condition is acceleration, acceleration history, speed, or speed history of the battery.

18. The system of claim 13, wherein the battery condition is internal pressure of the battery.

19. The system of claim 13, wherein the battery condition is structural integrity of the battery.

20. The system of claim 13, further comprising a memory configured to store a record of the battery condition.

21. The system of claim 13, further comprising a memory configured to store a record of the cooling system activation.

22. The system of claim 1, wherein the battery includes a heat transfer structure configured to transport heat from the interior of the battery to an external heat exchanger, and wherein the fluid delivery system is configured to route the working liquid into thermal contact with the external heat exchanger.

23. The system of claim 22, wherein the heat transfer structure includes a heat pipe.

24. The system of claim 22, wherein the heat transfer structure includes a coolant flow conduit.

25. The system of claim 22, wherein the heat transfer structure includes a thermal conductor.

26. The system of claim 1, further comprising triggering circuitry configured to activate the cooling system in response to an external command.

27. The system of claim 1, further comprising flow rate circuitry configured to control a flow rate of the working liquid within the fluid delivery system, wherein the flow rate circuitry is configured to respond to a battery condition by adjusting the flow rate of working liquid delivered to the battery.

28. The system of claim 27, wherein the flow rate circuitry is configured to deliver the working liquid to the battery in response to a battery temperature profile.

29. The system of claim 1, wherein the battery includes a plurality of cells, and wherein the fluid delivery system is configured to deliver working liquid to individual cells at different rates.

30. A method of cooling a battery, comprising:
bringing a working liquid into thermal contact with at least a portion of the battery;
allowing heat from the battery to vaporize the working liquid upon said thermal contact; and
venting the vaporized working liquid to the environment.

31. The method of claim 30, wherein bringing the working liquid into thermal contact with at least a portion of the battery includes routing working liquid through the battery interior.

32. The method of claim 30, wherein bringing the working liquid into thermal contact with at least a portion of the battery includes activating the cooling system in response to a battery condition.

33. The method of claim 32, wherein the battery condition is temperature.

34. The method of claim 32, wherein the battery condition is current.

35. The method of claim 32, wherein the battery condition is rate of change of temperature.

36. The method of claim 32, wherein the battery condition is acceleration, acceleration history, speed, or speed history of the battery.

37. The method of claim 32, wherein the battery condition is internal pressure of the battery.

38. The method of claim 32, wherein the battery condition is structural integrity of the battery.

39. The method of claim 32, further comprising storing a record of the battery condition in a memory.

40. The method of claim 32, further comprising storing a record of the cooling system activation in a memory.

41. The method of claim 30, further comprising transporting heat from the interior of the battery to an external heat exchanger, wherein bringing the working liquid into thermal contact with at least a portion of the battery includes bringing the working liquid into thermal contact with the external heat exchanger.

42. The method of claim 30, wherein bringing the working liquid into thermal contact with at least a portion of the battery includes activating the cooling system in response to an external command.

43. The method of claim 30, further comprising responding to a battery condition by adjusting a flow rate of working liquid delivered to the battery.

44. The method of claim 30, wherein the battery includes a plurality of cells, and wherein bringing the working liquid into thermal contact with at least a portion of the battery includes delivering liquid to individual cells at different rates.

45. A system for cooling a battery, comprising:
means for bringing a working liquid into thermal contact with at least a portion of the battery;
means for allowing heat from the battery to vaporize the working liquid upon said thermal contact; and
means for venting the vaporized working liquid from the bringing means to the environment.

* * * * *